Feb. 25, 1958 B. CHANCE 2,825,055

BOMBING COMPUTER APPARATUS

Filed June 7, 1945 6 Sheets-Sheet 1

INVENTOR.
BRITTON CHANCE
BY William D. Hall.
ATTORNEY

INVENTOR.
BRITTON CHANCE
BY
William D. Hall
ATTORNEY

INVENTOR.
BRITTON CHANCE
BY
William D. Hall
ATTORNEY

INVENTOR
BRITTON CHANCE
BY
William D. Hall
ATTORNEY

INVENTOR
BRITTON CHANCE
BY William D. Hall
ATTORNEY

Feb. 25, 1958 B. CHANCE 2,825,055

BOMBING COMPUTER APPARATUS

Filed June 7, 1945 6 Sheets-Sheet 6

INVENTOR
BRITTON CHANCE

BY William D. Hall.
ATTORNEY

United States Patent Office 2,825,055

Patented Feb. 25, 1958

2,825,055

BOMBING COMPUTER APPARATUS

Britton Chance, Cambridge, Mass., assignor, by mesne assignments, to the United States of America as represented by the Secretary of War

Application June 7, 1945, Serial No. 598,165

14 Claims. (Cl. 343—7)

This invention relates generally to electrical apparatus and more particularly to a navigating and blind bombing system.

Long range bombing by aircraft presents the problems of accurately navigating the aircraft to reach a designated target, of identifying the target, and of dropping bombs to hit the target.

Such bombing is frequently carried out in weather of low or zero visibility, and over paths selected with consideration for feinting movements and for enemy anti-aircraft concentration rather than with consideration for ease of navigation.

When the vicinity of the target is reached and the positions of several objects, all similar to the target, are known with respect to the aircraft, it is often difficult to determine which is the preselected target. An example of this occurs when the target is a certain city and the aircraft, known by navigational computations to be near the target, finds itself in the vicinity of several cities.

When the designated target is reached and identified, the aircraft must enter into a bombing run which passes through a proper bomb release point. Defensive measures by the enemy against the bombing aircraft are usually heaviest at this point making it desirable that the aircraft take evasive action as by a weaving course. It is thus desirable that the straight bombing run be as short as is consistent with determining that the run is a proper one.

Radio object detection apparatus may be carried by the aircraft to aid in navigation, identification of the target, and bombing. However, the target is frequently of such a nature that it gives little or no radio echo or one that is difficult to distinguish from other echoes. Furthermore, such apparatus is vulnerable to enemy action and it is susceptible to being rendered inoperable near the target. It is thus desirable that the bombing operation be capable of being carried out without the aid of such apparatus.

One of the objects of this invention is to provide a system permitting an aircraft to be navigated with precision to any preselected target or reference point within the range of the aircraft. Another object is to provide an apparatus which will permit accurate bombing of a target by allowing the aircraft to approach the target from any direction, without adhering to a fixed course, and taking evasive action if desired, up to a few seconds from the bomb release point. Another object of this invention is to provide a system whereby the target may be accurately bombed whether or not it can be detected by radio object detection apparatus.

Generally this invention provides a system for accurate navigating and bombing by dead reckoning. Computing elements also solve for course and distance to navigational points as well as to any objectives.

Other objects, features, and advantages of this invention will suggest themselves to those skilled in the art and will become apparent from the following description of the invention taken in connection with the accompanying drawing in which.

Figure 1:
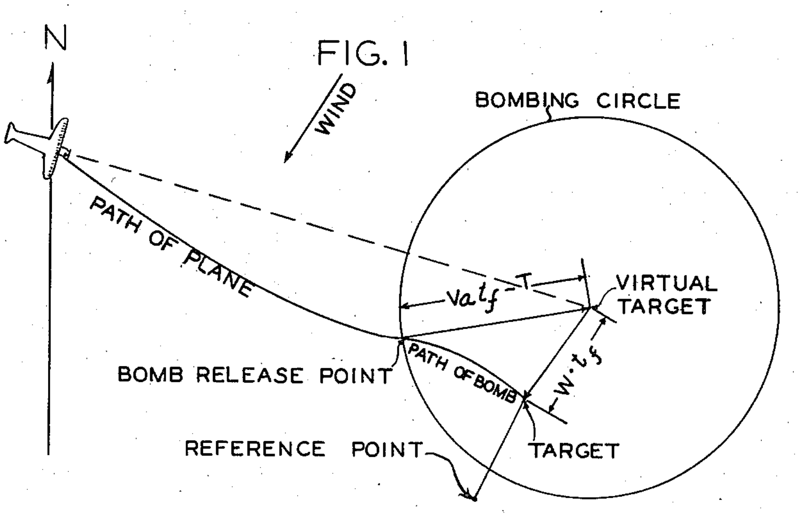
Fig. 1 is a schematic diagram illustrating the geometry of bombing.

Referring now more particularly to Fig. 1 for an explanation of bombing geometry, the bomb will hit the target if it is released at any point on the bombing circle while the aircraft is heading at the virtual target, which is the center of the bombing circle. The virtual target is upwind from the target by a distance equal to the wind velocity multiplied by the time of fall. The time of fall is a function of the altitude and the type of bomb and is usually obtained from tables arrived at empirically. The radius of the bombing circle is a distance equal to the velocity ($V_a$) of the aircraft multiplied by the time of fall ($t_f$) less trail (T). Trail, the distance by which the bomb trails behind the aircraft at the instant of impact, is a function of the altitude, the velocity of the aircraft, and the type of bomb and is also usually found from empirical tables.

It thus appears that if the bomb is released at the bombing circle while the aircraft is headed at the virtual target, thte bomb will have a component of velocity $V_a$ towards the center of the bombing circle and the corresponding vector will have a length equal $V_a t_f - T$, since the component due to trail is in exactly the opposite direction to the aircraft heading at the bomb release point. The bomb will also have a component of velocity due to the wind and the corresponding vector will be in the direction of the wind and will have a length equal to $(W.t_f)$.

Since the one vector $(V_a t_f - T)$ will always extend to the center of the bombing circle, or virtual target, and the other vector $(W.t_f)$ will always extend from the center of the circle to the target, it is apparent that the aircraft may approach the virtual target from any angle, and take any evasive action up to the point of crossing the circle. It must however, be headed toward the center of the circle at the instant of crossing the circle.

Figure 2:
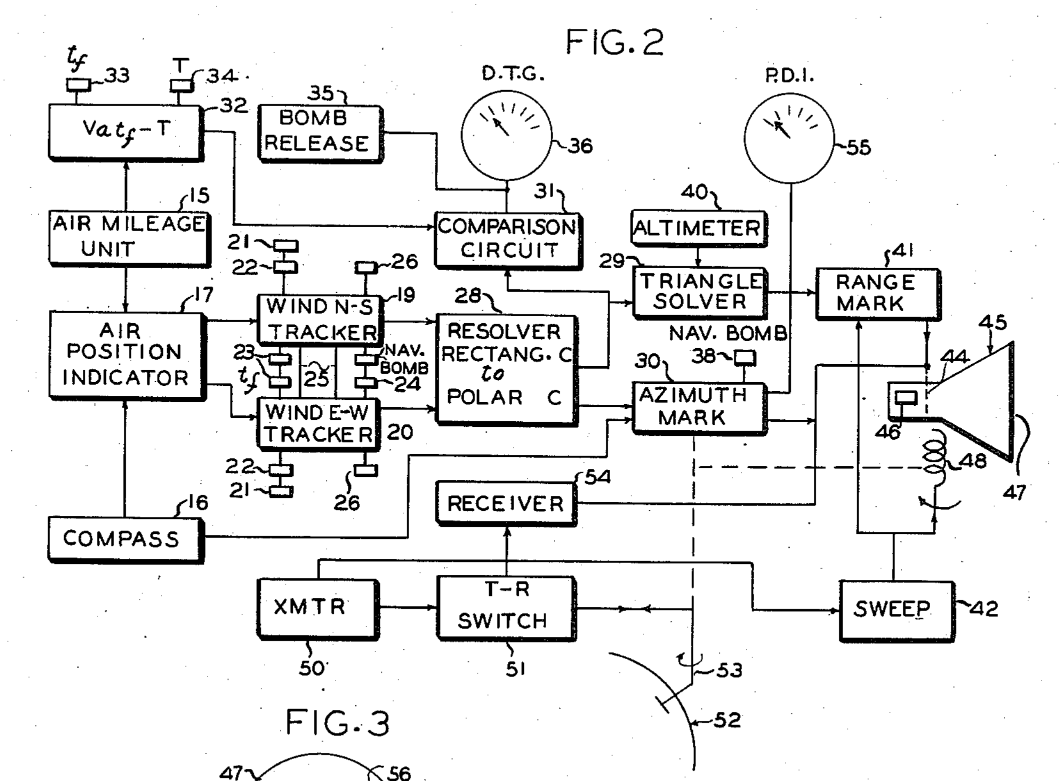
Fig. 2 is a block diagram of a system embodying the principles of this invention.

Referring now to Fig. 2 for a description of a system embodying the principles of this invention, an air position indicator 17 receives an indication of airspeed (the true speed of the aircraft with respect to the air mass) from air mileage unit 15 and an indication of the heading of the aircraft from compass 16. Air mileage unit 15 may be any mechanism capable of accurately indicating the airspeed of the aircraft and it may include an air screw, a Venturi tube, or a Pitot tube and may be corrected for air density and temperature. The compass 16 may be any type of compass, such as the fluxgate compass, capable of giving an accurate indication of the aircraft's heading with respect to north.

Air position indicator 17 may comprise any apparatus capable of receiving airspeed and compass heading and resolving these quantities into air miles along a north-south (N–S) axis and air miles along an east-west (E–W) axis. One apparatus for accomplishing this function will be explained below with reference to Fig. 4. Air miles are the miles the aircraft is displaced with respect to the air mass.

Wind tracker 19 receives air miles N–S from air position indicator 17 and is provided with cooperating knobs 21 and 22 for making position and wind speed adjustments respectively. Knob 21 may be used for setting into the apparatus the N–S coordinates of a fix. A fix, the ground position with respect to which the course (ground track) is being plotted, will be referred to again below. Wind tracker 19 is also provided with knobs 23 for making adjustments for time of fall and is further provided with switch 24 having "navigate" and "bomb" positions. Wind tracker 19 is supplied from a source 25 with alternating current.

Wind tracker 19 integrates the wind velocity N–S at which the air mass travels and adds the resulting miles by which the air mass is displaced during the period of integration to the air miles that the aircraft is displaced through the air mass, thus giving an output equal to the ground miles that the aircraft is displaced with respect to the earth. This output, N–S ground miles, is fed to resolver 28. Wind tracker 19 may consist of any apparatus that will perform this function. One such apparatus will be described below with reference to Fig. 5. Wind miles are the miles the air mass is displaced with respect to the earth and are the result of wind. Ground miles are the miles the aircraft is displaced with respect to the earth.

Wind tracker 20 receives E–W air miles from air position indicator 17. Component 20 is constructed in a manner similar to wind tracker 19 and supplies E–W ground miles to resolver 28.

Resolver 28 receives N–S ground miles and E–W ground miles from wind trackers 19 and 20 respectively.

Component 28 resolves this information into polar coordinates. One of these polar coordinates is ground range from the aircraft to the fix, set by knobs 21—21. The other coordinate is the angle at the aircraft between north and said fix. An apparatus suitable for use as resolver 28 will be explained below with reference to Fig. 6.

Ground range is fed to triangle solver 29 and to comparison circuit 31. Comparison circuit 31 is also supplied with a voltage equal to $V_a.t_f-T$ from component 32. Component 32 is supplied by air mileage unit 15 with an indication of airspeed. Component 32 is also provided with knobs 33 and 34 which are adjustable to provide an indication of time of fall and trail respectively. Component 32 may consist of any apparatus that will provide the required voltage. It may consist of a means for turning the indication of airspeed into a voltage proportional to that quantity. This voltage may be applied to a potentiometer, the movable tap of which is adjusted by knob $t_f$ to effectively supply a voltage equal to $V_a.t_f$. The potential of one end of the potentiometer may be adjusted by knob 34 with respect to ground to subtract a portion equal to T.

Comparison circuit 31 may consist of any apparatus for comparing the voltage supplied by component 32 and the voltage proportional to ground range supplied by resolver 28, giving an output voltage proportional to the difference of the voltages from components 32 and 28. Such circuits are well known to those skilled in the art. Comparison circuit 31 supplies a voltage to bomb release mechanism 35 and distance-to-go (DTG) meter 36. Meter 36 reads zero, and bomb release component 35 is energized, or deenergized, to release the bomb when the output of comparison circuit 31 reaches zero.

Since the range output of resolver 28 is an alternating voltage, the output of component 32 may also be an alternating voltage. However, it will be obvious to those skilled in the art that the output of component 32 may be a D.-C. voltage.

Triangle solver 29 is supplied a voltage proportional to ground range from resolver 28 and is also supplied with an indication of the aircraft's altitude from altimeter 40. Triangle solver 29 converts altitude and ground range to the ground fix into the slant range from the aircraft to the ground fix. Triangle solver 29 may consist of any apparatus capable of solving for the hypotenuse of a ring triangle given the other two sides. A suitable circuit will be described below with reference to Fig. 7.

Slant range provided by triangle solver 29 is supplied to range marker circuit 41. Range marker circuit 41 is also supplied with a linear sawtooth sweep wave from sweep circuit 42. Component 41 may consist of any circuit capable of providing a range marking pulse at a distance along the sweep wave proportional to the slant range of the ground fix from the aircraft. Such a circuit will be described below with reference to Fig. 8. The output of range marker circuit 41 is applied to the grid 44 of cathode ray tube 45, which also comprises an electron gun 46, fluorescent screen 47, and magnetic deflecting coils 48.

Cathode ray tube 45 is the indicator means of a radio object detection system comprising transmitter 50 which supplies a series of short radio frequency pulses through transmit-receive (T–R) switch to antenna 52. Antenna 52 transmits a directional beam which may be tilted downward and is rotated about vertical axis 53. Antenna 52 is also connected through T–R switch 51 to receiver 54, the output of which is supplied to the grid 44 of indicator tube 45. T–R switch 51 serves to disconnect receiver 54 from transmitter 50 while a pulse is being transmitted but connects receiver 54 to antenna 52 in the interval between pulses. Sweep circuit 42 is synchronized with transmitter 50 so that its sweep will be initiated at the beginning of one transmitted pulse and terminated at the beginning of the next transmitted pulse.

Deflection coil 48 is rotated about the axis of indicator tube 45 in synchronism with the rotation of antenna 52. An indication of the rotation of antenna 52 is also supplied to azimuth mark circuit 30. Circuit 30 is also supplied with the aircraft's compass heading from compass 16. Cathode ray tube 45 thus gives Plan Position Indication (PPI) in which echoes received from ground objects are displayed in polar coordinates around a center which is usually the position of the aircraft.

Azimuth mark circuit 30 is provided with a "navigation-bomb" switch 38. With switch 38 in "navigate" position, circuit 30 provides an azimuth mark to the intensity grid 44 of cathode ray tube 45. With switch 38 in "bomb" position, circuit 30 supplies a voltage to a Pilot's Direction Indicator (PDI) 55. Azimuth mark circuit 30 may consist of any circuit capable of receiving the compass heading of the aircraft, the heading of the aircraft with respect to the ground fix and the momentary direction of the rotating antenna 52 and producing an azimuth mark indicative of the azimuth of the ground fix on cathode ray tube 45. Circuit 30 must also be capable of indicating on meter 55 the deviation of the heading of the aircraft from the bearing of the virtual target. A suitable circuit will be described below with reference to Fig. 9.

Figure 3:
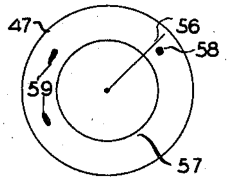
Fig. 3 shows the indicator screen of the apparatus of Fig. 2.

Since the azimuth mark 56 on display screen 47 of indicator tube 45 as shown in Fig. 3 is stabilized with respect to north, the echoes displayed on tube 45 must also be similarly stabilized for proper representation. North stabilization of the display, so that north in the display is always oriented in one direction with respect to the indicator tube 45, may be obtained by any suitable means. One method consists of adjusting the angular position of the stator of the means rotating deflection coil 48, said adjustment being in accordance with the deviation of the aircraft's heading from north.

In Fig. 3 is shown the fluorescent screen 47 of indicator tube 45. Azimuth mark 56 and range mark 57 indicate the fix set by dials 21—21 of components 19 and 20. Trace 58 indicates an echo from the object chosen as a ground fix. Traces 59 indicate other echoes from other objects. The center of screen 47 indicates the relative position of the aircraft.

Figure 4:
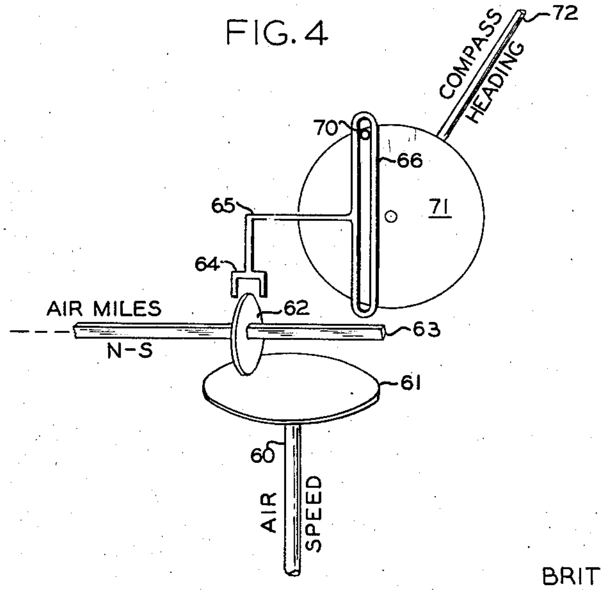
Fig. 4 is a schematic diagram of part of the air position indicator.

Referring now to Fig. 4 for an explanation of air position indicator 17, a shaft 60, extending from air mileage unit 15, has an angular displacement proportional to the air miles by which the aircraft is displaced through the air mass from the point of origin and a rotational speed proportional to the airspeed of the aircraft. In effect angular displacement means the number of revolutions the shaft has made. Shaft 60 rotates disc 61, the top of which is frictionally engaged by wheel 62 movably mounted on square, or splined, shaft 63. The position of wheel 62 is determined by fork 64 attached by member 65 to yoke 66. Yoke 66 is moved by pin 70 mounted on disc 71 which is rotated by shaft 72 in accordance with the compass heading of the aircraft.

By rotation of shaft 72, the position of wheel 62 is adjusted so that when the aircraft is headed due north, shaft 63 is given maximum speed in one direction by disc 61. When the aircraft is headed due east or due west, wheel 62 is positioned at the center of disc 61 and gives no rotation to shaft 63. If the aircraft is headed due south, the wheel 62 is positioned on the right side of disc 61 giving a maximum speed to shaft 63 but in the opposite direction to that given when the aircraft was headed due north. Shaft 63 thus has an angular displacement proportional to the displacement with respect to the air mass of the aircraft from its origin along the N–S coordinate. The angular displacement of shaft 63 is therefore the net number of revolutions corresponding to the net distance of air travel in the N–S direction. Shaft 63 may therefore be said to integrate the air distance traveled in the N–S coordinate. Shaft 63 has a rotational speed proportional to the speed component of the aircraft along the N–S coordinate.

A similar mechanism converts or integrates compass heading and airspeed into E–W air miles displacement, the mechanism being arranged so that due east or due west heading of the aircraft gives maximum airspeed indication while due north or due south heading of the aircraft gives zero indication.

Figure 5:
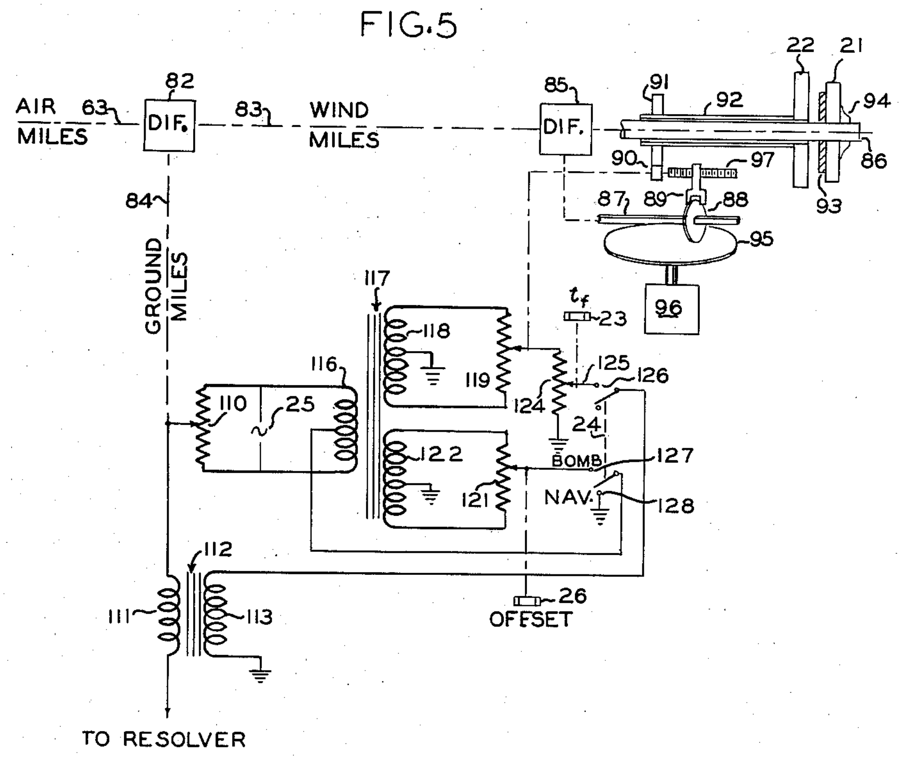
Fig. 5 is a schematic diagram of a wind tracker.

Referring now more particularly to Fig. 5 for an explanation of wind tracker 19, shaft 63 extending from air position indicator 17 has a rotational velocity proportional to the airspeed of the aircraft and an angular displacement proportional to the number of air miles the aircraft is displaced from the point of origin along a N–S axis. Differential 82 adds aid miles N–S given by shaft 63 to wind miles N–S given by shaft 83 to produce an angular displacement in shaft 84 proportional to ground miles the aircraft is displaced from the point of origin along a N–S axis. Shaft 83 is given an angular displacement proportional to wind miles by differential 85. Wind miles N–S are the miles the aircraft is displaced from the point of origin along an N–S axis due to the wind.

It will be evident then that we may consider the rotation of shaft 63 as integrating N–S air miles and that of shaft 83 as integrating N–S wind miles which are added by differential 82 to give the N–S ground miles traveled. Alternatively we may consider that shaft 63 produces a N–S air speed vector, that shaft 83 produces a N–S wind velocity vector and that these are combined by differential 82 so that the rotation of shaft 84 produces a resultant N–S ground speed vector and its total angular displacement integrates the ground speed to produce a N–S ground range vector corresponding to the component of travel in that coordinate direction. This latter point of view is more exact since the integration is made effective by the movement of the slider on potentiometer 110.

Differential 85 adds the angular displacements of shafts 86 and 87 to produce in shaft 83 an angular displacement proportional to wind miles N–S. Shaft 87 is driven by wheel 88 which is slideably mounted on the squared or splined end of that shaft. Wheel 88 is frictionally driven by disc 95 rotated at a constant speed by motor 96. The position of wheel 88 with respect to disc 95 is determined by fork 89. Fork 89 is moved by screw 97 which is turned by knob 22 through sleeve 92 and spur gears 90 and 91. The shaft 86 is turned by knob 21. Knob 21 is keyed to the splined end of shaft 86. Mounted on the underside of knob 21 is friction material 93, normally held out of engagement with knob 22 by spring 94.

Knob 21 may thus be turned alone to rotate shaft 86. Alternatively, knob 21 may be pushed toward knob 22 to engage the latter frictionally so that both may be adjusted simultaneously by rotation of knob 21. Adjustment of knob 21 operating through differential 85 changes the indication of the number of wind miles traveled by the aircraft. Adjustment of knob 22 adjusts the rotational rate of wheel 88 which rate corresponds to the component of wind velocity along the N–S axis and changes the angular displacement of shaft 83 which indicates the wind miles the aircraft is displaced due to wind from the point of origin along a N–S coordinate. Knob 21 thus adjusts the indication of the number of wind miles N–S by which the aircraft is displaced from the fix while knob 22 adjusts the rate at which wind miles are being traveled.

As pointed out above, knob 21 may be used to adjust the angular position of shaft 84 to indicate the ground miles the aircraft is displaced from the ground fix taken as a basis of computation. The rotation of knob 21 is added by differentials 85 and 82 to the rotation of shaft 84.

It will be clear, then, that knob 22 provides means for adjusting, in the N–S wind tracker unit or channel 19, the rate correction generating means, and knob 21 provides means for setting (via differentials 82 and 95) in the N–S channel the initial magnitude of the ground range vector, i. e., the position of the slider on potentiometer 110.

Shaft 84, the rotation of which is indicative of N–S ground miles the aircraft is displaced from the ground fix, moves the sliding contactor of potentiometer 110. Potentiometer 110 is supplied by potential from an alternating current source 25. Voltage from the movable contact of potentiometer 110 is thus proportional to the N–S ground miles by which the aircraft is displaced and is fed through secondary 111 of transformer 112 to resolver 28.

Current from alternating current source 25 is also applied to primary 116 of transformer 117. Secondaries 118 and 122 of transformer 117 are connected across potentiometers 119 and 121 respectively. The midpoint of secondaries 118 and 122 are grounded. The movable contactor of potentiometer 121 is moved by adjustment of offset knob 26, and is connected through contact 127 of switch 24, when said switch is in "bomb" position, to the midpoint of primary 116. When switch 24 is in "navigate" position, the center of primary 116 is grounded through contact 128. The movable contactor of potentiometer 119 is connected through potentiometer 124 to ground. Movable contact 125 is adjusted along potentiometer 124 by adjustment of "time of fall" knob 23. Movable contact 125 is connected through contact 126 of switch 24, when said switch is in "bomb" position, to the primary 113 of transformer 112 and then to ground. The movable position of the movable contactor of potentiometer 119 is adjusted by knob 22.

It is thus evident that with the switch 24 in "navigate" position, the potential of the moving contactor of potentiometer 110 is conducted unchanged to resolver 28. However, with switch 24 in "bomb" position, the potential from potentiometer 110 is altered by the current flowing through primary 113 of transformer 112. The position of the movable contactor of potentiometer 119 is adjusted by knob 21 in dependence upon the wind speed. The potential picked up by the contactor of potentiometer 119 is multiplied by the "time of fall" as represented by the setting of movable contactor 125. This latter contactor is adjusted by knob 23 in accordance with the time of fall of the bomb. With switch 24 in "bomb" position the potential applied to primary 116 is modified by the position of the contactor 121, which is set by knob 26 in accordance with the offset component along the N–S axis in offset bombing. The arrangement therefore comprises means for generating a N–S range offset vector and a N–S wind offset vector and means for adding these vectors to the N–S ground range vector.

E–W wind tracker 20 is constructed in the same manner as N–S wind tracker 19 shown in Fig. 5.

Figure 6:
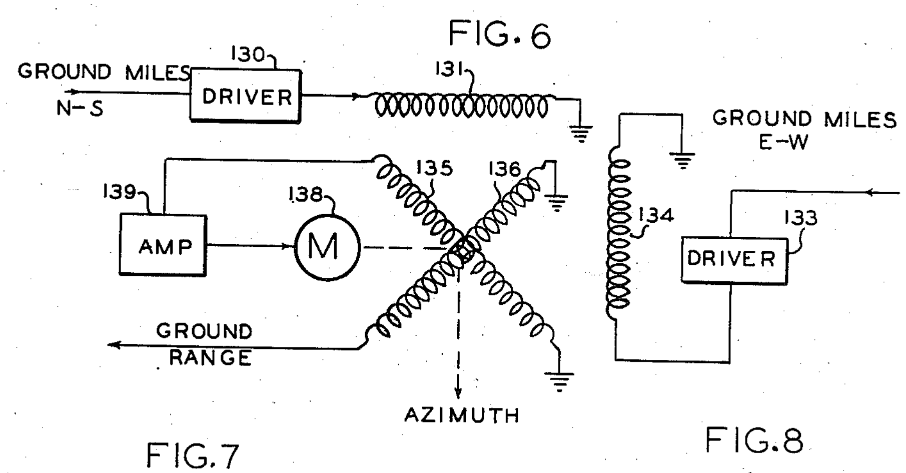
Fig. 6 is a schematic diagram of a resolver.

Referring now to Fig. 6 for an explanation of an apparatus suitable for use as resolver 28, a potential, the magnitude of which is proportional to the ground miles by which the aircraft is displaced from the fix in an N–S direction is received from wind tracker 19 and applied to driver 130. Driver 130 may be any amplifier having large input impedance and small output impedance to supply current proportional to ground miles N–S to stationary winding 131. A voltage proportional to ground miles E–W is received from wind tracker 20 and applied to driver 133 which is similar to driver 130. The output of driver 133 is connected to stator winding 134.

Rotor coils 135 and 136 are wound, with the axis of each at a right angle to the axis of the other, on a rotor, the angular position of which is determined by motor 138. Motor 138 receives driving current from amplifier 139 which receives its input from rotor coil 135. The rotor is thus caused to rotate until coil 135 is so oriented that it has induced in it a minimum voltage. Rotor coil 136, being at right angles to rotor coil 135, is then at a point of maximum voltage. The voltage induced in rotor coil 136 is proportional to the ground range of the ground fix from the aircraft. The angular position of the rotor is proportional to the angle with respect to north from the aircraft to the ground fix. The arrangement therefore comprises means for resolving the ground range vectors from both wind tracker channels to polar components of calculated ground range and direction to a chosen point or ground fix.

Figure 7:
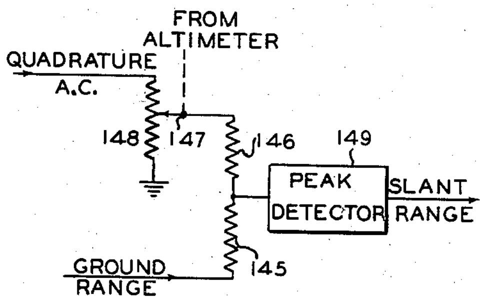
Fig. 7 is a schematic diagram of a triangle solver.

Referring to Fig. 7 for an explanation of an apparatus suitable for use as triangle solver 29. An alternating voltage proportional to ground range as supplied by resolver 28 is applied to one end of resistor 145. The other end of resistor 145 is connected through resistor 146 to the movable contactor 147 of potentiometer 148. Contactor 147 is moved along potentiometer 148 in accordance with the altitude of the aircraft as indicated by altimeter 40. A uniform alternating voltage, the phase of which is separated by 90° from the phase of the ground range voltage, is applied to one end of potentiometer 148, the other end of this potentiometer being grounded. The quadrature voltage applied to potentiometer 148 may be taken from the original source 25 and shifted in phase by any conventional phase shifting apparatus. This quadrature voltage may also be obtained from a quadrature winding of the generator supplying source 25.

Resistors 145 and 146, being equal, produce at their junction a voltage proportional to the sum of voltages applied to the other ends of these resistors. This voltage proportional to the sum of an alternating voltage proportional to ground range and a quadrature alternating voltage proportional to altitude is detected in peak detector 149 to give a voltage proportional to the square root of the sum of the squares of the ground range and altitude voltages. The output voltage of peak detector 149 is thus proportional to the slant range from the aircraft to the ground fix.

Figure 8:
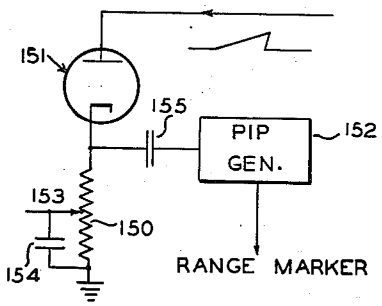
Fig. 8 is a schematic diagram of a range marker.

Referring to Fig. 8 for an explanation of the range mark circuit 41, the voltage proportional to slant range provided by triangle solver 29 is applied to a medial point 153 along resistor 150, the cathode resistor of diode 151. Point 153 may be connected to ground through condenser 154. A linear sawtooth sweep from sweep circuit 42 is supplied to the plate of diode 151. At the point along the sawtooth wave at which the bias applied by the slant range to resistor 150 is overcome, diode 151 suddenly becomes conductive, and a pulse is passed through condenser 155 to pip generator 152. Pip generator 152 contains a conventional peaking circuit to develop a sharp range marker pulse from the leading edge of the pulse passed from resistor 150. Pip generator circuits are well known and may include a differentiating circuit.

Figure 9:
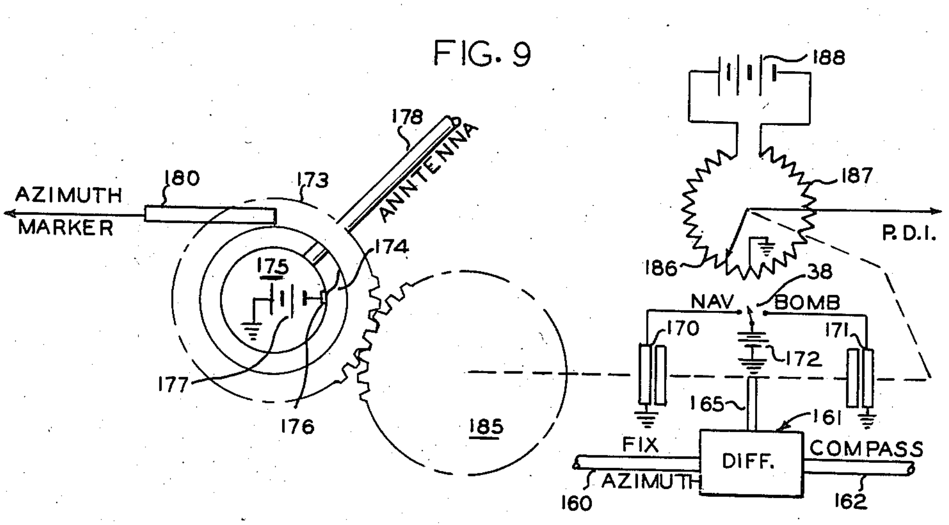
Fig. 9 is a schematic diagram of an azimuth marker.

Referring now to Fig. 9 for an explanation of the azimuth marker circuit, an angular shaft displacement proportional to the azimuth angle of the ground fix with respect to the aircraft is fed through shaft 160 to differential gear assembly 161. An angular shaft displacement proportional to the compass heading of the aircraft with respect to North is fed through shaft 162 to differential 161. The fix azimuth angle indicated by the angular displacement of shaft 160 and the compass angle indicated by the angular displacement of shaft 162 are added in differential 161 to give an angular displacement in shaft 165 proportional to the deviation in the heading of the aircraft from the bearing of the ground fix.

This angular shaft displacement may be fed through magnetic clutch 170 to spur gear 185 which rotates toothed ring 173. The angular displacement of shaft 165 may also be fed through magnetic clutch 171 to determine the orientation of contactor 186 on potentiometer 187. Battery 172 is connected through "navigation-bomb" switch 38 to energize either of magnetic clutches 170 or 171. Magnetic clutches 170 and 171 are thus selectively operable.

With switch 38 in "navigation" position the angular displacement of shaft 165 determines the angular position of ring 173. Disc 175 is rotated by shaft 178 which rotates synchronously with the antenna of the radio object locating apparatus. Brush 180 makes contact with ring 173 to provide an azimuth marker pulse when conducting segment 176 contacts brush 174. Ring 173 has an angular position in phase with that of shaft 165.

With switch 38 in "bomb" position, contact 186 duplicates the angular displacement of shaft 165. Contact 186 slides along circular resistor 187 connected across battery 188. The voltage picked up by contact 186 is proportional to the deviation of the heading of the aircraft from the target and is conducted to the Pilot's Direction Indicator.

In operation, the apparatus is first set to perform its navigating function by adjustment of switches 24—24 and 38 to their navigate positions. By knobs 21—21, the N–S and E–W coordinates of the ground fix, chosen because it gives a distinctive radio echo, are set into wind trackers 19 and 20. Knobs 21—21 may be equipped with dials to allow indication of the total displacement of the aircraft from its origin by indication of total movement from fix to fix. Adjustment of knobs 21—21 results in movement of the electronic cross-hair consisting of azimuth mark 56 and range mark 57 to coincide with the position of the ground fix as displayed in polar coordinates on PPI screen 47.

Knob 22 on wind tracker 19 is adjusted in accordance with the wind velocity in N–S direction. Knob 22 of wind tracker 20 is adjusted in accordance with the wind velocity in the E–W direction. These velocities may be gotten through any meteorological methods or may be assumed.

When the aircraft is airborne and with the radio object detection apparatus in operation, the screen 47 will display echoes such as 58 and 59 reflected from ground objects displayed in polar coordinates with the plane at the center. The reflection from the first fix 58 should coincide with cross-hair 56—57.

As the aircraft travels, the fix 58 will move on screen 47 with respect to the position of the aircraft. If the wind velocity and direction have been correctly assumed, the cross-hair 56—57 will move with the fix 58 and always coincide therewith. If the cross-hair 56—57 moves with respect to the fix 58 it can again be brought into proper coincidence by adjustments of position knobs 21—21 and new wind rates can be inserted by knobs 22—22. The adjustment of position made by one turn of knob 21—21 is so related to the adjustment of the rate made by one turn of knob 22 that, if the aircraft has been airborne since the last adjustment of the position and if a predetermined time, such as three minutes, has elapsed since then, knobs 21—21 may be frictionally gripped to knobs 22—22 and an adjustment of cross-hair 56—57 on fix 58 will result also in proper adjustment of the wind rate.

As one course of the journey is completed or as the original fix leaves the range of the radio object detection apparatus, a new fix is selected. Since the cross-hair position is adjusted in accordance with N–S and E–W coordinates, any echo taken as a fix may be identified by its map coordinates with respect to the former fix. The target may be thus identified in the same manner and used as the last fix.

If the target gives a good radio echo, the cross-hair 56—57 is adjusted to coincide with its echo on screen 47. When the target is closely approached to within, for example, 10 miles, switches 24—24 and 38 are adjusted to their "bomb" positions. The time of fall, which may be obtained from tables, is set in wind trackers 19 and 20 by adjustment of knobs 23—23. Such adjustment, through action of resistor 124, and transformer 112 (shown in Fig. 5) causes the information fed to resolver 28 to be based on a virtual target upwind from the actual target by a distance equal to $W.t_f$. The contactor on potentiometer 119 is set by knobs 22—22 in accordance with wind direction and velocity.

Time of fall and trail, which may also be obtained from tables, are set in component 32 by means of knobs 33 and 34, respectively. Component 32 then provides a voltage proportional to $V_a \cdot t_f - T$ to operate the distance-to-go meter 36 and the bomb release 35.

The above adjustments cause the electronic cross-hair to disappear from display screen 47 and the pilot's direction indicator 55 to become operative to indicate the deviation of the aircraft heading with respect to the true bearing of the virtual target. Distance-to-go meter 36 is arranged along with the pilot's direction indicator 55 before the pilot and indicates the distance-to-go to the bomb release point. The pilot may now take any lateral evasive or weaving action to avoid antiaircraft action from the ground. It is only required that when the distance-to-go meter 36 reaches zero that the deviation indicated by the pilot's direction indicator 55 also read zero for at this moment the bombs will automatically release through action of bomb release 35.

If the target reflects no distinctive radio echo but is a known distance and direction from an object, such as the fork of a river, which does give a distinctive radio echo, the latter point may be chosen as a reference point for offset bombing. The coordinates of the reference point with respect to the target are set into wind trackers 19 and 20 by knobs 26—26 and the aircraft is flown with electronic cross-hairs 56—57 tracking the reference point for a short period before switches 24—24 and 38 are set to their "bomb" position. It is thus seen that once the cross-hair 56—57 is accurately tracking the target or reference point, switches 24—24 and 38 may be set to "bomb" position and even though radar components, such as those indicated at 42, 45, 50, 51, 52, 53, and 54 fail to operate, distance-to-go meter 36 and pilot's direction indicator 55 will continue to give accurate bombing information to the pilot by dead reckoning.

Figure 10:
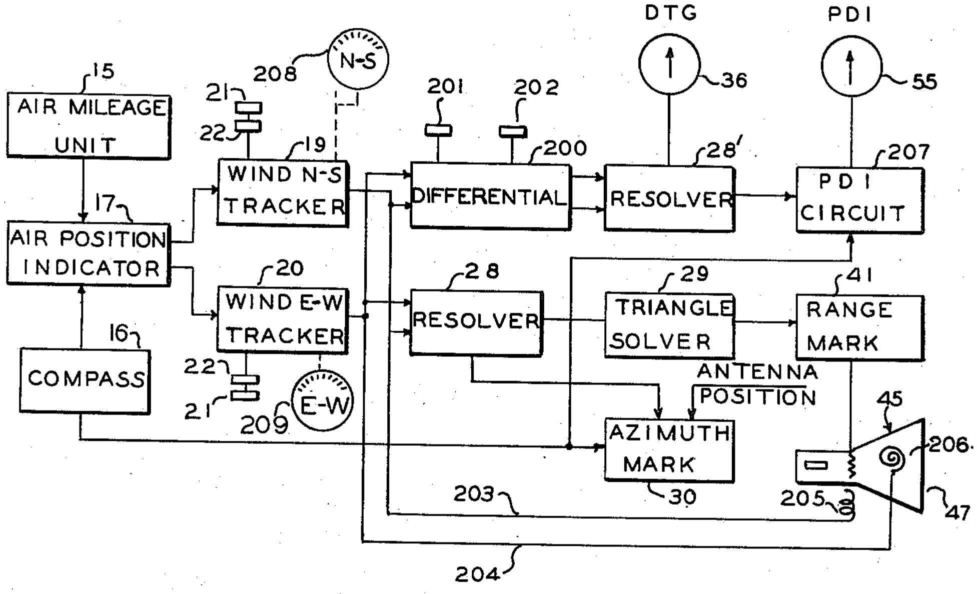
Fig. 10 is a block diagram of an alternate embodiment of the invention shown in Fig. 2.

The alternative embodiment of this invention shown in Fig. 10 employs two resolvers 28 and 28' permitting indications of the aircraft with respect not only to the fix used as a basis of computation but also with respect to the aircraft destination, which may be the target. The embodiment in Fig. 10 employs, for the most part, the same components as employed in Fig. 2, the same components in the two figures being indicated by the same reference number.

In Fig. 10 the N–S ground miles produced by wind trackers 19 and 20 are fed through differential 200 to resolver 28'. Differential 200 is provided with knobs 201 and 202 which adjust the measure of the N–S and E–W ground miles respectively. Resolver 28' the structure of which is identical to resolver 28 produces a voltage proportional to the ground range to the destination and also produces an angular shaft displacement proportional to the angle between the heading of the aircraft and the direction from the aircraft to the destination.

The alternating voltages produced by wind trackers 19 and 20 may be converted into mechanical motions, fed through mechanical differentials and converted back to alternating voltages. Alternatively the adjustment of N–S and E–W ground miles may be made electrically.

Resolver 28' feeds to distance-to-go meter 36 a voltage proportional to ground range from the aircraft to the destination. The measure of the angle between the aircraft heading and direction of the destination is fed to PDI circuit 207. PDI circuit 207 may be any apparatus capable of combining with the compass heading of the aircraft a shaft rotation proportional to the angular direction of the destination from the aircraft to produce a voltage proportional to the deviation of the aircraft heading with respect to the direction of the destination. PDI circuit 207 may consist of elements 161, 186, 187, and 188 of Fig. 9.

In the operation of the embodiment shown in Fig. 10, knobs 201 and 202 of differential 200 are adjusted in accordance with the N–S and E–W distances respectively to the destination from the reference point. These distances may be determined from a map showing both the destination and the reference point. Resolver 28' has an operation similar to that of resolver 28 but causes meter 36 to indicate the distance-to-go to the destination. Pilot's direction indicator 55 will accordingly indicate the deviation of the aircraft's heading from the destination. The other components, not all of which are shown in Fig. 10, operate as set forth above with respect to Fig. 2. In this embodiment, as shown vectorally in Fig. 11, while the electronic cross-hairs track a reference point with a prominent echo on display tube 45, meters 36 and 55 indicate to the pilot, through the use of the second resolver 28', the direction and distance to the destination.

Figure 11:
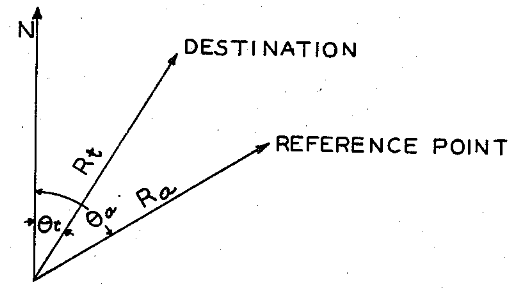
Fig. 11 shows vectors explaining the operation of the apparatus shown in Fig. 10.

In Fig. 11, $R_t$ and $\theta_t$ designate the ground range and heading deviation of the aircraft with respect to the destination (or target) respectively, while $R_a$ and $\theta_a$ designate the ground range and heading deviation of the aircraft with respect to the fix used as a basis of computation. While $R_t$ the ground range to the destination is indicated on distance-to-go meter 36, $R_a$ the ground range to the reference point is converted by triangle solver 29 to the slant range so that it may be compared on screen 47 of indicator tube 45 with the slant range of the reference point as determined by the radio object detection apparatus.

In Fig. 10, lines 203 and 204 may be used to supply the voltage from wind trackers 19 and 20 to auxiliary deflection coils 205 and 206 respectively of display tube 45. This causes the PPI display to be offset on screen 57 in accordance with the distance of the aircraft from the target and tends to maintain the target at the center of the screens. If the outputs of components 19 and 20 are alternating voltages, means, not shown, must be provided to convert said outputs to direct voltages before application to deflection means 205 and 206. If deflecting means 205 and 206 are magnetic coils, a direct current varying in accordance with the outputs of components 19 and 20 must be provided.

It will be obvious that this offset PPI display may be employed with any of the other embodiments of this invention. It will also be obvious that any other navigational aid may be used for determining the true position of the aircraft. Visual observation may also be used for determining true position.

In Fig. 10 are shown dials 208 and 209 operated by the output of wind trackers 19 and 20 as by mechanical connection to shafts 84—84, as shown in Fig. 5. Dials 208 and 209 indicate the computed displacements of the aircraft along the coordinates used from the zero of the coordinates. It will be obvious that such dials may be used with the other embodiments of the invention.

Figure 12:
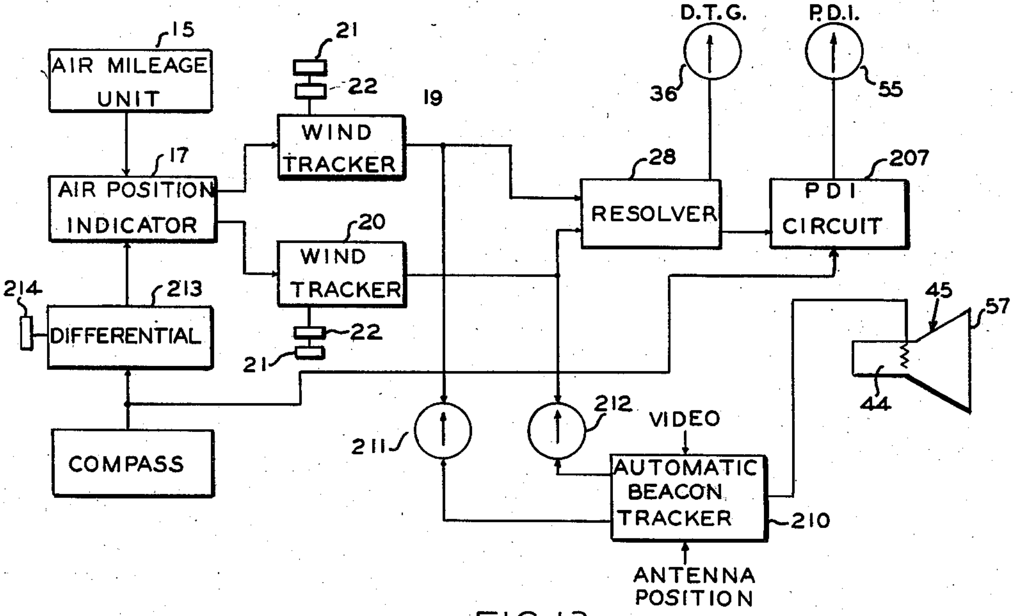
Fig. 12 is a block diagram of a further alternate embodiment of the invention of Fig. 2.

In Fig. 12 is shown another alternate embodiment of the invention in which the actual position of the aircraft is determined by the use of responder beacons. This embodiment is used with two responder beacons of known position and which, when interrogated by the search beam of the radio object detection apparatus, respond with an identifying coded response. The time required for the response of a beacon to be received back by the aircraft is an indication of the range from the aircraft to the beacon.

The embodiment shown in Fig. 12 may employ the components of Fig. 2, many of which are not shown. The same component in the embodiments of Figs. 2 and 12 are indicated by the same reference numeral. Fig. 12 also employs an automatic beacon tracker 210 which receives the coded replies of the interrogated beacons. A beacon tracker capable of automatically tracking a selected beacon in range is disclosed in an application by Andrew B. Jacobsen, Serial No. 584,233, entitled "Electrical Measuring System," filed March 22, 1945, now Patent No. 2,609,533. In beacon tracker 210, voltages will be produced proportional to the range from the aircraft to each beacon. The sum and difference of these voltages will be supplied by beacon tracker 210 to meters 211 and 212 respectively.

Figure 14:
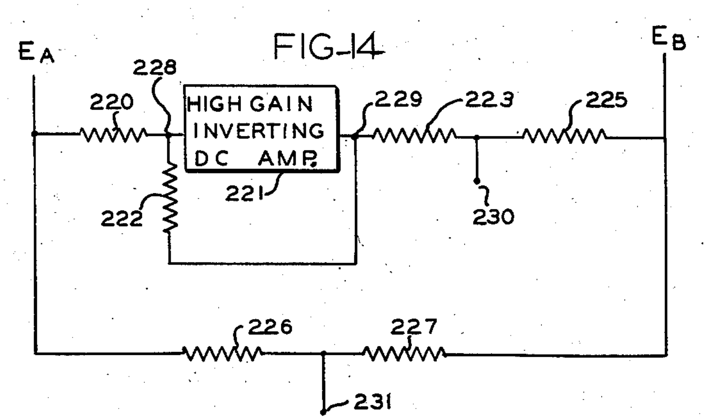
Fig. 14 is a schematic diagram of one part of the automatic beacon tracker shown in Fig. 12.

Fig. 14 shows a circuit suitable for producing the sum and difference of the voltages proportional to the beacon ranges. Voltage $E_a$ proportional to the range of one beacon is applied through resistor 220 to a high gain inverting D.-C. amplifier 221, the output of which is fed back to the input through resistor 222. The output of amplifier 221 and $E_b$, the voltage proportional to the range to the other beacon, are fed through equal resistors 223 and 225 respectively to output terminal 230. Voltages $E_a$ and $E_b$ are also fed through equal resistors 226 and 227 respectively to output terminal 231.

In the operation of the apparatus shown in Fig. 14, terminal 228 at the input of amplifier 221 remains at a substantially constant potential, since any tendency for the potential at this point to fall is offset by the feedback from the output of amplifier 221. This causes the potential at terminal 229, at the output of amplifier 221, to be proportional to a constant minus the voltage $E_a$. This voltage and the voltage $E_b$ are added by means of resistors 223 and 225 to give an output proportional to $$\frac{E_b-E_a}{2}$$

Voltages $E_a$ and $E_b$ are added by means of resistors 226 and 227 to give an output proportional to $$\frac{E_b+E_a}{2}$$

Figure 15:
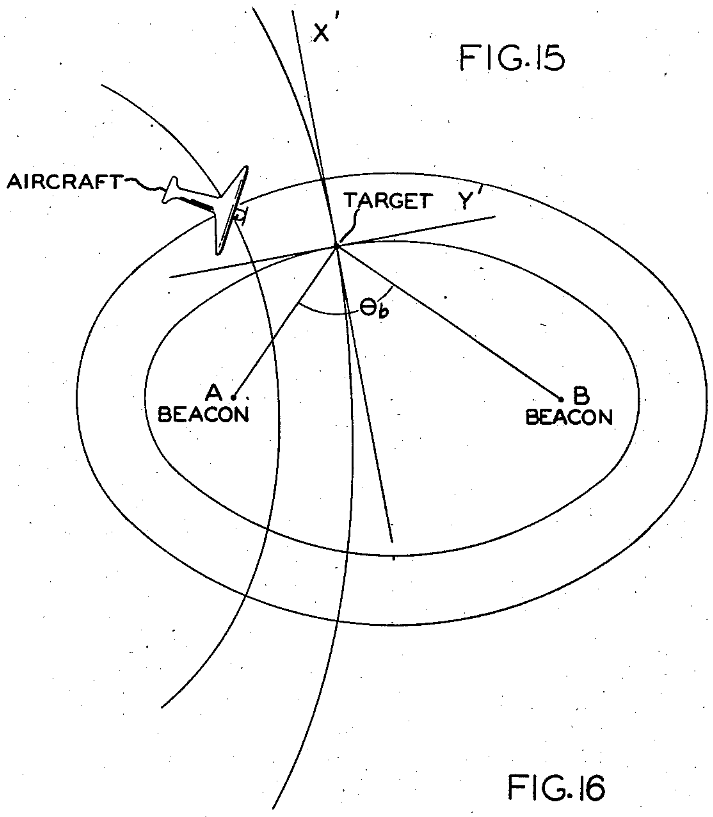
Fig. 15 is a diagram explaining the operation of the apparatus shown in Fig. 12.

Before the voltage proportional to the sum of the beacon ranges are applied to meter 211, it must be multiplied by the reciprocal of the $$\text{cosine } \frac{\theta_b}{2}$$

and multiplied by the reciprocal of volts per mile, $\theta_b$ being the angle formed by lines drawn from the destination (or target) to beacons A and B, as seen in Fig. 15. The angle $\theta_b$ can be obtained from a map showing the target and the beacons. The "volts per mile" are the volts per mile in the beacon range produced by the beacon tracker 210. Similarly the voltage proportional to the difference of the beacon range must be multiplied by the reciprocal of the $$\text{sine } \frac{\theta_b}{2}$$

and multiplied by the reciprocal of volts per mile. The construction of a potentiometer for effecting such multiplication will be obvious to those skilled in the art.

Differential 213 with adjustment knob 214 is provided to alter the compass heading supplied to air position indicator 17. As shown in Fig. 15 the locus of points for any one difference of response times is a hyperbola, while the locus of points for any one sum of response times is an ellipse. The ellipses and hyperbolas corresponding to various response times form an orthogonal system of curves having right angle intersections.

When the aircraft is near the target, as in bombing and with the proper spacing between the beacons, the curvatures of the ellipses and hyperbolas become so slight as to closely approach straight lines. The knob 214 of differential 213 may be adjusted to reorient the system of coordinates given to air position indicator 17 so that the new coordinates ($x'$ and $y'$ in Fig. 15) coincide with the ellipsoidal and hyperbolic coordinates at the target. The coordinates given by beacon tracker 210 denote the relative positions of the aircraft and the destination. If position knobs 21—21 on wind trackers 19 and 20 are adjusted so that the destination is the zero of the dead reckoning coordinates, then the beacon coordinates are effectively the same as the coordinates given by wind trackers 19 and 20 allowing comparison by error meters 211 and 212. When meters 211 and 212 read zero, the coordinates supplied by component 210 are equal to the coordinates supplied by trackers 19 and 20 indicating that the dead reckoning data from elements 19 and 20 is correct.

Figure 13:
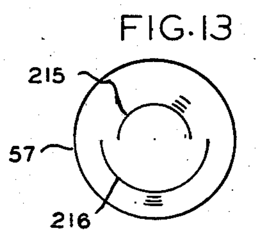
Fig. 13 is an elevational view showing the indicator screen of the apparatus in Fig. 12.

An indication of the beacon response and a range mark may be fed from beacon tracker 210 to the control grid 44 of display tube 45 to give a visible trace as shown at 215 and 216 in Fig. 13. This allows monitoring of the beacon responses, shows whether component 210 is tracking the selected beacons, and also gives visual indication of the beacon ranges. An indication of antenna rotation is also fed to beacon tracker 210. Switches may be arranged, manually or automatically, in component 210 to apply, as the antenna points toward each beacon, an indication of the response and range of that beacon permitting indication of both beacons to appear simultaneously. The apparatus for producing the range indicating pulses may be constructed as shown in Fig. 8.

The use of the N–S and E–W coordinates in Figs. 2 and 10 are particularly advantageous in that this use facilitates conversion of position into latitude and longitude and facilitates the plotting of circumpolar courses. The use of such rectangular coordinates also facilitates the combination of wind velocity, and direction with the airspeed of the aircraft. Since this invention computes approximate position in rectangular coordinates, whenever true position data is available in rectangular coordinates a direct comparison is possible allowing correction to be made for position and wind or other errors in computations. Conversion of the rectangular coordinates to polar coordinates enables comparison with the PPI display of the radio object detection apparatus and also enables indication of the direction and distance from the aircraft to the destination.

It will be obvious that the embodiment of the invention shown in Figs. 10 and 12 might be supplementary to the embodiment shown in Fig. 2. The various embodiments might be used alternately, switches being arranged to shift the common components from one system to another.

Figure 16:
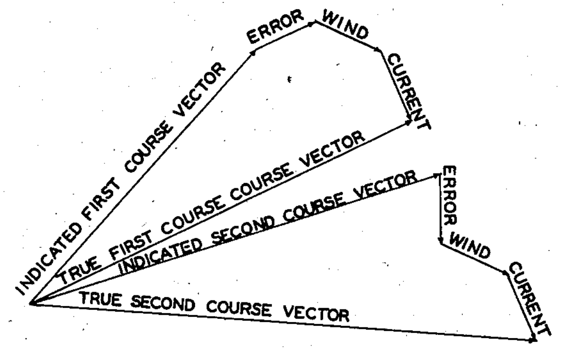
Fig. 16 shows vectors explaining one use of the invention.

Although the operation of this device has been explained with respect to the navigation of the aircraft, it is obvious that it may be used for the navigation of any ambulatory object such as a ship. It will also be obvious that although this invention has been shown as correcting for wind that it might also correct for other factors such as instrument error and current. Referring now more particularly to Fig. 16 a seaborne ship sailing a first indicated course may, because of instrument error, wind and water currents, be sailing a true first course as indicated in Fig. 16. A vector corresponding to error, wind, and current could readily be determined by means of this invention and a corresponding adjustment could be made so that, thenceforward, computations would be made on a basis including the newly determined vector. Position dials operated by the outputs of wind trackers 19 and 20 indicate displacements and position along N–S and E–W coordinates. The position of the object being navigated may thus be determined at any time with respect to the point of origin or other fix point. If a second indicated course were taken, a new error might arise, but the wind and current vectors would remain the same giving a true second course vector as shown in Fig. 16.

In the use of the navigating system described, it is not necessary that the components thereof be carried by the vehicle, the course of which is being computed. Any or all of the components such as the computing apparatus for the radio object detection apparatus may be fixed with respect to the ground or carried in another vehicle as long as provision is made for the suitable transmission of data between the components. Transmission of data could be effected either by remote control of adjustments or by manually adjusting the computing apparatus in accordance with intelligence received by radio.

It might be desirable to compute on a ship the relative positions of the ship and an aircraft carrying radio object detection apparatus. It might also be advantageous to compute at the ground site of a radio object detection apparatus the position and course of an aircraft. The apparatus set forth herein will in each case furnish the course and distance of the aircraft to any particular point for the purposes of navigation or bombing. Further, the course and distance of the aircraft can be computed to any point with respect to a ship or to any point with respect to the land provided the vector corresponding to the ships motion is entered in the computer. In each of these latter two cases, information as to the aircraft heading and speed may be obtained by transmission from the aircraft and may be set into the computing apparatus.

The above described apparatus can also be used, when the radio object detection apparatus and computer are carried by a first aircraft, to compute the position and course of a second aircraft with respect to the earth. In this case a first computing apparatus determines the position of the first aircraft. A second apparatus adjusted in accordance with the speed and heading data received from the second aircraft computes the ground position of the second aircraft and its position relative to the first aircraft. This latter position can be indicated on the display means of the radio object detection apparatus carried by the first aircraft. Corrections can then be made to cause the computed position of the second aircraft as indicated on said display means to coincide with the actual displayed position as explained above. In general the wind affecting both of the aircraft will be the same and the wind rate adjustments affecting the computations for the two aircraft may be interconnected. The corrected ground position of the second aircraft may be used to give the correction to the course and distance of the second aircraft towards any predetermined object, for purposes of navigation and bombing. It is obvious that this system could be extended to cover more than two aircraft or other mobile craft.

While the operation of this device has been disclosed with respect to the dropping of one bomb, it is obvious that a number of bombs may be dropped simultaneously or that the bomb release may automatically drop a series of bombs at predetermined intervals. It is also obvious that, while the method of navigation set forth is particularly advantageous when visibility is low, its use will be advantageous under any conditions, since it tends to eliminate navigational computaton and make navigation more automatic. It is further obvious that the zero coordinate reference point need not be the point of origin of the aircraft but may be any other point on, above, or below the earth's surface.

While there has been described what is at present considered to be the preferred embodiment of this invention, it will be obvious to those skilled in the art that various changes and modifications may be made therein without departing from the scope of the invention as set forth in the appended claims.

The invention claimed is:

1. An aircraft navigation and bombing system comprising means for determining the components of range and direction from said craft to a chosen point on the ground, means for continuously measuring the components of air speed and heading direction of the craft, means operatively responsive to said measuring means for converting said components to produce in two channels signals corresponding to vector components of air speed in two rectangularly coordinate reference directions, means for generating and adding in each of said channels a rate correction vector signals simulating a component of wind velocity to provide in said channels resultant signal vector components of ground speed in said coordinate directions, means for integrating in each of said channels said vector components of ground speed continuously to provide ground range vectors corresponding to the components of travel of the craft in said coordinate directions, means for setting in each of said channels initial magnitudes of said ground range vectors to correspond to the location in said coordinate directions of said craft relative to said point, means for resolving said ground range vectors from both of said channels to polar components of calculated ground range and direction to said point, means for comparing said calculated and said determined range components and direction components, and means for simultaneously adjusting in each of said channels said rate correction generating means and said ground range setting means to effect in said comparing means a continuing agreement of said calculated and said measured range and direction components.

2. An aircraft navigation and bombing system comprising means for determining the components of range and direction from said craft to a chosen point on the ground, means for continuously measuring the components of air speed and heading direction of the craft, means operatively responsive to said measuring means for converting said components to produce in two channels signals corresponding to vector components of air speed in two rectangularly coordinate reference directions, means for generating and adding in each of said channels a rate correction vector signal simulating a component of wind velocity to provide in said channels resultant signal vector components of ground speed in said coordinate directions, means for integrating in each of said channels said vector components of ground speed continuously to provide ground range vectors corresponding to the components of travel of the craft in said coordinate directions, means for setting in each of said channels initial magnitudes of said ground range vectors to correspond to the location in said coordinate directions of said craft relative to said point, means for resolving said ground range vectors from both of said channels to polar components of calculated ground range and direction to said point, means for comparing said calculated and said determined range components and direction components, and means for adjusting in each of said channels said rate correction generating means and said ground range setting means to effect in said comparing means a continuing agreement of said calculated and said measured range and direction components, said means for determining range and direction components comprising a pulse type radar for determining slant range and azimuth of objects on the ground and having a map type of display scope to serve as said comparing means; the system further comprising means for converting said calculated ground range component signal to slant range marker pulses synchronously recurrent at the radar pulsing rate, means for converting said calculated direction component signal to an azimuth marker pulse and means for applying said pulses to said display scope to simulate cross-hair indices.

3. An aircraft navigation and bombing system comprising means for determining the components of range and direction from said craft to a chosen point on the ground, means for continuously measuring the components of air speed and heading direction of the craft, means operatively responsive to said measuring means for converting said components to produce in two channels signals corresponding to vector components of air speed in two rectangularly coordinate reference directions, means for generating and adding in each of said channels a rate correction vector signal simulating a component of wind velocity to provide in said channels resultant signal vector components of ground speed in said coordinate directions, means for integrating in each of said channels said vector components of ground speed continuously to provide ground range vectors corresponding to the components of travel of the craft in said coordinate directions, means for setting in each of said channels initial magnitudes of said ground range vectors to correspond to the location in said coordinate directions of said craft relative to said point, means for resolving said ground range vectors from both of said channels to polar components of calculated ground range and direction to said point, means for comparing said calculated and said determined range components and direction components, and means for adjusting in each of said channels said rate correction generating means and said ground range setting means to effect in said comparing means a continuing agreement of said calculated and said measured range and direction components, said means for determining range and direction components comprising a pulse type radar having a map type of display scope to serve as said comparing means; the system further comprising means for converting said calculated ground range component signal to range marker pulses synchronously recurrent at the radar pulsing rate, means for converting said calculated direction component signal to an azimuth marker pulse and means for applying said pulses to said display scope to simulate cross-hair indices.

4. An aircraft navigation and bombing system comprising means for determining the components of range and direction from said craft to a chosen point on the ground, means for continuously measuring the components of air speed and heading direction of the craft, means operatively responsive to said measuring means for converting said components to produce in two channels signals corresponding to vector components of air speed in two rectangularly coordinate reference directions, means for generating and adding in each of said channels a rate correction vector signal simulating a component of wind velocity to provide in said channels resultant signal vector components of ground speed in said coordinate directions, means for integrating in each of said channels said vector components of ground speed continuously to provide ground range vectors corresponding to the components of travel of the craft in said coordinate directions, means for setting in each of said channels initial magnitudes of said ground range vectors to correspond to the location in said coordinate directions of said craft relative to said point, means for resolving said ground range vectors from both of said channels to polar components of calculated ground range and direction to said point, means for comparing said calculated and said determined range components and direction components, and means for adjusting in each of said channels said rate correction generating means and said ground range setting means to effect in said comparing means a continuing agreement of said calculated and said measured range and direction components, said means for determining range and direction comprising a radar having a map type of display scope to serve as said comparing means; the system further comprising means for utilizing said ground range vector signals to control the center position of the ray of said oscilloscope in relation to travel of the craft effectively to maintain said map type of display stationary.

5. An aircraft navigation and bombing system comprising means for determining the components of range and direction from said craft to a chosen point on the ground, means for continuously measuring the components of air speed and heading direction of the craft, means operatively responsive to said measuring means for converting said components to produce in two channels signals corresponding to vector components of air speed in two rectangularly coordinate reference directions, means for generating and adding in each of said channels a rate correction vector signal simulating a component of wind velocity to provide in said channels resultant signal vector components of ground speed in said coordinate directions, means for integrating in each of said channels said vector components of ground speed continuously to provide ground range vectors corresponding to the components of travel of the craft in said coordinate directions, means for setting in each of said channels initial magnitudes of said ground range vectors to correspond to the location in said coordinate directions of said craft relative to said point, means for resolving said ground range vectors from both of said channels to polar components of calculated ground range and direction to said point, means for comparing said calculated and said determined range components and direction components, means for adjusting in each of said channels said rate correction generating means and said ground range setting means to effect in said comparing means a continuing agreement of said calculated and said measured range and direction components, means for generating range offset vector signals corresponding to the coordinates of location of said target from said chosen point, means for generating wind offset vector signals corresponding to the coordinates of location of a virtual target from said actual target including means for effectively multiplying each of said signal wind velocity vectors by a factor proportional to the time of fall of the bomb, means for adding to the ground range vector signal in each of said channels the offset vector signal and the wind offset vector signal representing the reference direction coordinate to which the channel corresponds, effectively to alter said calculated signal components of direction and ground range to represent the location of said virtual target, means for generating a potential component corresponding to the radius of a bombing circle as defined by air speed multiplied by time of fall of the bomb less the factor of trail, means for comparing the signal components representing said calculated direction to said virtual target and said measured heading direction of the craft to indicate by their equality the correct steering when releasing the bomb and means for comparing the signal components representing said bombing circle radius and said calculated ground range to said virtual target to effect the release of the bomb when said signal components are equal.

6. An aircraft navigation and bombing system comprising means for determining the components of range and direction from said craft to a chosen point on the ground, means for continuously measuring the components of air speed and heading direction of the craft, means operatively responsive to said measuring means for converting said components to produce in two channels signals corresponding to vector components of air speed in two rectangularly coordinate reference directions, means for generating and adding in each of said channels a rate correction vector signal simulating a component of wind velocity to provide in said channels resultant signal vector components of ground speed in said coordinate directions, means for integrating in each of said channels said vector components of ground speed continuously to provide ground range vectors corresponding to the components of travel of the craft in said coordinate directions, means for setting in each of said channels initial magnitudes of said ground range vectors to correspond to the location in said coordinate directions of said craft relative to said point, means for resolving said ground range vectors from both of said channels to polar components of calculated ground range and direction to said point, means for comparing said calculated and said determined range components and direction components, means for adjusting in each of said channels said rate correction generating means and said ground range setting means to effect in said comparing means a continuing agreement of said calculated and said measured range and direction components, means for generating wind offset vector signals corresponding to the coordinates of location of a virtual target from said actual target including means for effectively multiplying each of said wind velocity vector signals by a factor proportional to the time of fall of the bomb, means for adding to the ground range vector signal in each of said channels the wind offset vector signal representing the reference direction coordinate to which the channel corresponds, effectively to alter said calculated signal components of direction and ground range to represent the location of said virtual target, means for generating a potential component corresponding to the radius of a bombing circle as defined by air speed multiplied by time of fall of the bomb less the factor of trail, means for comparing the signal components representing said calculated direction to said virtual target and said measured heading direction of the craft to indicate by their equality the correct steering when releasing the bomb and means for comparing the signal components representing said bombing circle radius and said calculated ground range to said virtual target to effect the release of the bomb when said components are equal.

7. An aircraft navigation and bombing system comprising means for determining the components of range and direction from said craft to a chosen point on the ground, means for continuously measuring the components of air speed and heading direction of the craft, means operatively responsive to said measuring means for converting said components to produce in two channels signals corresponding to vector components of air speed in two rectangularly coordinate reference directions, means for generating and adding in each of said channels a rate correction vector signal simulating a component of wind velocity to provide in said channels resultant signal vector components of ground speed in said coordinate directions, means for integrating in each of said channels said vector components of ground speed continuously to provide ground range vectors corresponding to the components of travel of the craft in said coordinate directions, means for setting in each of said channels initial magnitudes of said ground range vectors to correspond to the location in said coordinate directions of said craft relative to said point, means for resolving said ground range vectors from both of said channels to polar components of calculated ground range and direction to said point, means for comparing said calculated and said determined range components and direction components, means for adjusting in each of said channels said rate correction generating means and said ground range setting means to effect in said comparing means a continuing agreement of said calculated and said measured range and direction components, means for generating range offset vector signals corresponding to the coordinates of location of said target from said chosen point, means for generating wind offset vector signals proportional to wind velocity and time of fall of the bomb to define the coordinates of location of a virtual target from said actual target, means for adding to the ground range vector signal in each of said channels the offset vector and the wind offset vector signals representing the reference direction coordinate to which the channel corresponds, effectively to alter said calculated signal components of direction and ground range to represent the location of said virtual target, means for generating a potential component proportional to time of fall of the bomb to define the radius of a bombing circle, means for comparing the components representing said calculated direction to said virtual target and said heading direction of the craft to indicate by their equality the correct steering when releasing the bomb and means for comparing the components representing said bombing circle radius and said calculated ground range to said virtual target to effect the release of the bomb when said signal components are equal.

8. An aircraft navigation and bombing system comprising means for determining the components of range and direction from said craft to a chosen point on the ground, means for continuously measuring the components of air speed and heading direction of the craft, means operatively responsive to said measuring means for converting said components to produce in two channels signals corresponding to vector components of air speed in two rectangularly coordinate reference directions, means for generating and adding in each of said channels a rate correction vector signal simulating a component of wind velocity to provide in said channels resultant signal vector components of ground speed in said coordinate directions, means for integrating in each of said channels said vector components of ground speed continuously to provide ground range vectors corresponding to the components of travel of the craft in said coordinate directions, means for setting in each of said channels initial magnitudes of said ground range vectors to correspond to the location in said coordinate directions of said craft relative to said point, means for resolving said ground range vectors from both of said channels to polar components of calculated ground range and direction to said point, means for comparing said calculated and said determined range components and direction components, means for adjusting in each of said channels said rate correction generating means and said ground range setting means to effect in said comparing means a continuing agreement of said calculated and said measured range and direction components, a second means, connected to each of said channels at points following said setting means, for modifying the setting therein of the magnitudes of said ground range vector signals to correspond to the location in said coordinate directions of said craft relative to a second point displaced from said chosen point, a second means for resolving said last mentioned ground range vector signals simultaneously to provide polar components of calculated range and direction to said second point.

9. An aircraft navigation and bombing system comprising means for determining the components of range and direction from said craft to a chosen point on the ground, means for continuously measuring the components of air speed and heading direction of the craft, means operatively responsive to said measuring means for converting said components to produce in two channels signals corresponding to vector components of air speed in two rectangularly coordinate reference directions, means for generating and adding in each of said channels a rate correction vector signal simulating a component of wind velocity to provide in said channels resultant signal vector components of ground speed in said coordinate directions, means for integrating in each of said channels said vector components of ground speed continuously to provide ground range vectors corresponding to the components of travel of the craft in said coordinate directions, means for setting in each of said channels initial magnitudes of said ground range vectors to correspond to the location in said coordinate directions of said craft relative to said point, means for resolving said ground range vectors from both of said channels to polar components of calculated ground range and direction to said point, means for comparing said calculated and said determined range components and direction components, means for adjusting in each of said channels said rate correction generating means and said ground range setting means to effect in said comparing means a continuing agreemet of said calculated and said measured range and direction components, means for generating range offset vector signals corresponding to the coordinates of location of said target from said chosen point, means for generating wind offset vector signals corresponding to the coordinates of location of a virtual target from said actual target including means for effectively multiplying each of said wind velocity vector signals by a factor proportional to the time of fall of the bomb, means for introducing the said ground range vector signal from each one of said channels into a parallel channel, means for adding to said range vector signals in each of said parallel channels the offset vector and the wind offset vector signals representing the reference direction coordinate to which the channel corresponds, effectively to alter said calculated signal components of direction and ground range to represent the location of said virtual target, means for generating a potential component corresponding to the radius of a bombing circle as defined by air speed multiplied by time of fall of the bomb less the factor of trail, means for comparing the components representing said calculated direction to said virtual target and said measured heading direction of the craft to indicate by their equality the correct steering when releasing the bomb and means for comparing the signal components representing said bombing circle radius and said calculated ground range to said virtual target to effect the release of the bomb when said signal components are equal.

10. An aircraft navigation and bombing system comprising means for determining the components of range and direction from said craft to a chosen point on the ground, means for continuously measuring the components of air speed and heading direction of the craft, means operatively responsive to said measuring means for converting said components to produce in two channels signals corresponding to vector components of air speed in two rectangularly coordinate reference directions, means for generating and adding in each of said channels a rate correction vector signal simulating a component of wind velocity to provide in said channels resultant signal vector components of ground speed in said coordinate directions, means for integrating in each of said channels said vector components of ground speed continuously to provide ground range vectors corresponding to the components of travel of the craft in said coordinate directions, means for setting in each of said channels initial magnitudes of said ground range vectors to correspond to the location in said coordinate directions of said craft relative to said point, means for resolving said ground range vectors from both of said channels to polar components of calculated ground range and direction to said point, means for comparing said calculated and said determined range components and direction components, and means for adjusting in each of said channels said rate correction generating means and said ground range setting means to effect in said comparing means a continuing agreemet of said calculated and said measured range and direction components, said means for determining range and direction components comprising a beacon tracking circuit, said beacon tracking circuit comprising means for producing potentials corresponding to the distances from said craft to two beacon stations located at known points from said chosen point; the system further comprising means for utilizing said potentials to determine the initial setting of said ground range vector signals.

11. An aircraft navigation and bombing system comprising means for determining the range and direction of said craft relative to a chosen point on the ground, means for continuously measuring air speed and heading direction of said craft, means operatively controlled by said measuring means for continuously calculating the ground range and direction of said craft relative to said chosen point, said calculating means having included therein means for effecting a correction in the rate of measuring of said air speed and means for initially setting the calculated range and direction to said chosen point; means for comparing said calculated and said measured range and direction to said chosen point, and means for adjusting said rate correction means and said range and direction setting means to provide in said comparing means a continuing agreement of said measured and said calculated range and direction to said chosen point, said means for determining range and direction comprising a pulse type radar system having a map type of display scope to serve as said comparing means; the system further comprising means for converting said calculated ground range to slant range marker pulses synchronously recurrent with the radar pulsing rate, means for converting said calculated direction to an azimuth marker pulse and means for applying said pulses to said display scope to simulate cross-hair indices.

12. An aircraft navigation and bombing system comprising means for determining the range and direction of said craft relative to a chosen point on the ground, means for continuously measuring air speed and heading direction of said craft, means operatively controlled by said measuring means for continuously calculating the ground range and direction of said craft relative to said chosen point, said calculating means having included therein means for effecting a correction in the rate of measuring of said air speed and means for initially setting the calculated range and direction to said chosen point, means for comparing said calculated and said measured range and direction to said chosen point, and means for adjusting said rate correction means and said range and direction setting means to provide in said comparing means a continuing agreement of said measured and said calculated range and direction to said chosen point, said means for determining range and direction comprising a radar having a map type of display scope to serve as said comparing means; the system further comprising means operatively controlled by said ground range calculating means to control the center position of the ray of said scope in relation to travel of the craft effectively to maintain said map type of display stationary.

13. An aircraft navigation and bombing system comprising means for determining the range and direction of said craft relative to a chosen point on the ground, means for continuously measuring air speed and heading direction of said craft, means operatively controlled by said measuring means for continuously calculating the ground range and direction of said craft relative to said chosen point, said calculating means having included therein means for effecting a correction in the rate of measuring of said air speed and means for initially setting the calculated range and direction to said chosen point, means for comparing said calculated and said measured range and direction to said chosen point, means for adjusting said rate correction means and said range and direction setting means to provide in said comparing means a continuing agreement of said measured and said calculated range and direction to said chosen point, means for generating signal components representing the offset of the location of said target from said chosen point and the wind offset of the location of a virtual target from said actual target, means for adding vectorially in said calculating means said offset component signals effectively to alter said calculated ground range and direction to represent the location of said virtual target, means for generating a potential component proportional to the time of fall of the bomb to define the radius of a bombing circle, means for comparing said calculated direction to said virtual target with said measured heading direction of the craft to indicate by their equality the correct steering when releasing the bomb and means for comparing said bombing circle radius and said calculated ground range to said virtual target to effect the release of the bomb when said distances are equal.

14. In a navigation and bombing system, computing means for producing potentials corresponding to the range and heading direction to a virtual target upwind from an actual target location by a distance $W \times t_f$, means for establishing a potential corresponding to the radius of a bombing circle of distance $V_a \times t_f - T$ drawn about said virtual target as a center; where $W$ equals wind velocity, $t_f$=time of fall of the bomb, $V_a$ equals air speed and $T$=trail; means for producing a potential corresponding to the heading direction of said craft, means for comparing respectively said potentials representing directions and said potentials representing range and radius, and means responsive to said comparing means for effecting the release of the bomb when said potentials representing directions are equal and said potentials representing range and radius are equal.

References Cited in the file of this patent

UNITED STATES PATENTS

| | | |
|---|---|---|
| 1,664,454 | Hunt et al. | Apr. 3, 1928 |
| 2,162,698 | Chafee et al. | June 20, 1939 |
| 2,433,284 | Luck | Dec. 23, 1947 |
| 2,438,112 | Darlington | Mar. 23, 1948 |
| 2,479,909 | Darlington | Aug. 23, 1949 |
| 2,480,208 | Alvarez | Aug. 30, 1949 |
| 2,488,448 | Townes | Nov. 15, 1949 |
| 2,492,355 | Campbell et al. | Dec. 27, 1949 |

FOREIGN PATENTS

| | | |
|---|---|---|
| 164,765 | Great Britain | June 23 ,1921 |